United States Patent
Zhu et al.

(10) Patent No.: US 10,826,285 B2
(45) Date of Patent: Nov. 3, 2020

(54) CORROSION PROTECTION CIRCUIT FOR SERIAL BUS CONNECTOR

(71) Applicant: NXP B.V., Eindhoven (NL)

(72) Inventors: Yijie Zhu, Shanghai (CN); Sung Hoon Bae, Seoul (KR); Sungil Ha, San Jose, CA (US)

(73) Assignee: NXP B.V., Eindhoven (NL)

( * ) Notice: Subject to any disclaimer, the term of this patent is extended or adjusted under 35 U.S.C. 154(b) by 136 days.

(21) Appl. No.: 16/283,850

(22) Filed: Feb. 25, 2019

(65) Prior Publication Data
US 2020/0235563 A1 Jul. 23, 2020

(30) Foreign Application Priority Data

Jan. 17, 2019 (CN) .......................... 2019 1 0046514

(51) Int. Cl.
| | |
|---|---|
| *H02H 1/00* | (2006.01) |
| *H02H 3/20* | (2006.01) |
| *G06F 1/26* | (2006.01) |
| *H02H 5/08* | (2006.01) |
| *H01R 24/60* | (2011.01) |
| *H01R 107/00* | (2006.01) |

(52) U.S. Cl.
CPC .......... *H02H 5/083* (2013.01); *H02H 1/0007* (2013.01); *G06F 1/266* (2013.01); *H01R 24/60* (2013.01); *H01R 2107/00* (2013.01); *H02H 3/20* (2013.01)

(58) Field of Classification Search
CPC ......... H02H 3/20; H02H 1/0007; G06F 1/266
USPC ............................ 323/266, 274, 276; 361/86
See application file for complete search history.

(56) References Cited

U.S. PATENT DOCUMENTS

| | | | |
|---|---|---|---|
| 8,144,021 B2 | 3/2012 | Page | |
| 8,575,723 B2 | 11/2013 | Tschmelitsch | |
| 9,823,286 B2 | 11/2017 | Connell | |
| 2014/0313039 A1 | 10/2014 | Stevens et al. | |
| 2015/0229119 A1* | 8/2015 | Tao | H02H 1/0007 |
| | | | 361/91.1 |
| 2016/0308527 A1* | 10/2016 | Kim | H03K 19/018592 |
| 2017/0139864 A1* | 5/2017 | Nge | G06F 13/385 |
| 2017/0155214 A1* | 6/2017 | Shen | H01R 13/6666 |
| 2017/0344508 A1* | 11/2017 | Setiawan | G06F 13/4282 |
| 2017/0358922 A1 | 12/2017 | Bacon et al. | |

(Continued)

FOREIGN PATENT DOCUMENTS

| | | |
|---|---|---|
| CN | 108268405 A | 7/2018 |
| EP | 3270297 A1 | 1/2018 |

(Continued)

*Primary Examiner* — Gary A Nash

(57) ABSTRACT

A circuit to protect a USB connector from corrosion on its CC pins includes a first node coupled to a first power source or a first pull-down resistor, a second node coupled to the CC pins and a second power source, and a second pull-down resister coupled to the second node. A detection circuit compares the voltage at the first node with a first reference voltage. The detection circuit also compares the voltage at the second node with second and third reference voltages. A control logic circuit generates a corrosion detection signal in response to the voltage at the second node being less than the third reference voltage and greater than the second reference voltage when the voltage at the first node is greater than the first reference voltage.

16 Claims, 5 Drawing Sheets

(56) References Cited

U.S. PATENT DOCUMENTS

2018/0059771 A1 3/2018 Kim et al.
2018/0181509 A1 6/2018 Jo

FOREIGN PATENT DOCUMENTS

EP          3617842 A1    3/2020
WO    WO-2018/211789 A1  11/2018

* cited by examiner

FIG. 1
-PRIOR ART-

| GND | TX1+ | TX1- | Vbus | CC1 | D+ | D- | SBU1 | Vbus | RX2- | RX2+ | GND |
|---|---|---|---|---|---|---|---|---|---|---|---|

| GND | RX1+ | RX1- | Vbus | SBU2 | D- | D+ | CC2 | Vbus | TX2- | TX2+ | GND |
|---|---|---|---|---|---|---|---|---|---|---|---|

FIG. 2
-PRIOR ART-

| GND | RX2+ | RX2- | Vbus | SBU1 | D- | D+ | CC | Vbus | TX1- | TX1+ | GND |
|---|---|---|---|---|---|---|---|---|---|---|---|

| GND | TX2+ | TX2- | Vbus | V<sub>CONN</sub> | | | SBU2 | Vbus | RX1- | RX1+ | GND |
|---|---|---|---|---|---|---|---|---|---|---|---|

CORROSION PROTECTION CIRCUIT FOR SERIAL BUS CONNECTOR

BACKGROUND

The present invention relates to serial bus technologies, and, more particularly, to Universal Serial Bus (USB) Type-C connector circuits.

The USB Type-C connector includes a receptacle and a plug. FIG. 1 shows a conventional USB Type-C connector receptacle 10. The USB Type-C connector receptacle 10 provides two pairs of power pins (Vbus), two pairs of ground pins (GND), two different pairs of data bus pins (D+/−), four pairs of high speed data bus pins (TX and RX), two sideband use pins (SBU1, SUB2) and two configuration channel pins (CC1, CC2).

FIG. 2 shows a conventional USB Type-C connector plug 20. The USB Type-C connector plug 20 provides two pairs of power pins (Vbus), two pairs of ground pins (GND), four pairs of high speed data bus pins (TX and RX), two sideband use pins (SBU1, SUB2), one pair of data bus pins (D+/−) and one configuration channel pin (CC). In addition, the plug 20 includes a voltage connect pin (Vconn) to provide power to circuitry within the plug 20. When the plug 20 is inserted into the receptacle 10, one of the CC pins (CC1 or CC2) in the receptacle 10 is connected to the CC pin in the plug 20 via the cable to establish signal orientation. The other CC pin (CC1 or CC2) in the receptacle 10 is provided as Vconn for powering circuitry within the plug 20.

In USB Type-C connectors, the configuration channels pins (CC pins) generally are used for detecting cable attach and detach, plug orientation (i.e., inserted upside or downside), and establishing Vbus current. The CC pins also are used for transmitting and receiving USB Power Delivery (PD) communication messages for establishing power contracts that allow voltage and current levels.

FIG. 3 shows a conventional USB connector circuit 30 with a CC/PD controller 32. The CC/PD controller 32 controls the CC pins (CC1,CC2) connected to a power source (e.g., a supply voltage of 5V) through a pull-up resistor (Rp) or connected to a ground source (GND) through a pull-down resistor (Rd). When one of the CC pins is connected to the power source, USB PD standard requires 80 µA, 180 µA or 330 µA as source power to detect a sink device. However, applying power to the CC pins accelerates the corrosion on CC pins when the CC pins are contaminated with water, especially salt water.

Furthermore, the CC/PD controller 32 may recognize the impedance cause by the water or moisture as a detected sink, and then provide 5V power through the Vbus pin, which will accelerate corrosion of the CC pins.

FIG. 4 shows another conventional USB connector circuit 40 with a controller 42 for protecting the USB connector circuit 40 against contamination by detecting the voltage on pins CC1 and CC2. When the voltage on pin CC1 or CC2 is detected, the controller 42 uses ADC test port 44 (ADC1) to compare the voltage on pin CC1 with a first reference voltage, or uses ADC test port 46 (ADC2) to compare the voltage on pin CC2 with a second reference voltage. The controller 42 instructs a logic processor 48 to charge pin CC1 only when the voltage on pin CC1 is not greater than the first reference voltage, or charge pin CC2 only when the voltage on pin CC2 is not greater than the second reference voltage. Therefore, only when a specific condition is met, the CC pin of the Type-C connector is powered on. Then the power-on period of the CC pins is shortened, which enhances protection of the Type-C connector. The circuit 40 turns off the current source on one CC pin, when a USB Type-C port is detected by the other CC pin, which decreases the total power on time of the CC pins. However, the circuit 40 does not actively try to decrease corrosion on the CC pins.

Thus, it would be desirable to have an efficient corrosion protection circuit for USB connector.

SUMMARY

This summary is provided to introduce a selection of concepts in a simplified form that are further described below in the Detailed Description. This summary is not intended to be relied on to identify key features or essential features of the claimed subject matter, nor is it intended to be used to limit the scope of the claimed subject matter.

In one embodiment, the present invention provides a circuit to protect a USB connector from corrosion on the CC pins. The circuit comprises a first node, a second node, a detection circuit, a control logic circuit and a switch. The first node is coupled to a first power source or ground. The second node is coupled to the CC pins and to a second power source. The detection circuit includes a first input coupled to the first node to compare a first voltage signal from the first node with a first reference voltage, a second input coupled to the second node to compare a second voltage signal from the second node with a second reference voltage and a third reference voltage. The control logic circuit outputs a corrosion detection signal in response to the voltage signal from the second node being less than the third reference voltage and greater than the second reference voltage, when the voltage signal from the first node is greater than the first reference voltage. The switch is coupled between the first and second nodes and is kept turned off to prevent current flow between the first and second nodes if corrosion is detected.

In one embodiment, the second voltage signal also is compared to an intermediate reference voltage, and the control logic circuit turns on the switch when the voltage signal from the first node is greater than the first reference voltage and the voltage signal from the second node is less than the intermediate reference voltage.

In another embodiment, the control circuit turns on the switch when the voltage signal from the first node is less than the first reference voltage and the voltage signal from the second node is greater than the second reference voltage.

The present invention also provides a USB Type-C connector with a corrosion protection circuit. The USB Type-C connector includes CC pins and a CC/PD controller. The CC/PD controller includes a first pull-up resistor connected to a power source and a first pull-down resistor connected to ground. The corrosion protection circuit is connected between one of the CC pins and the CC/PD control. The corrosion protection circuit comprises a first node, a second node, a detection circuit, a control logic circuit and a switch. The first node is coupled to a first power source or ground. The second node is coupled to the CC pins and to a second power source. The detection circuit includes a first input coupled to the first node to compare the voltage signal from the first node with a first reference voltage, a second input coupled to the second node to compare the voltage signal from the second node with second and third reference voltages. The control logic circuit generates a corrosion detection signal in response to the voltage signal from the second node being less than the third reference voltage and exceeding the second reference voltage when the voltage from the first node is greater than the first reference voltage.

The switch is coupled between the first and second nodes. The control logic circuit turns off the switch to prevent current flow between the first and second nodes if corrosion is detected.

BRIEF DESCRIPTION OF THE DRAWINGS

So that the manner in which the above recited features of the present application can be understood in detail, a more particular description of the application, briefly summarized above, can be had by reference to embodiments, some of which are illustrated in the appended drawings. It is to be noted, however, that the appended drawings illustrate only typical embodiments of this application and are therefore not to be considered limiting of its scope, for the application can admit to other equally effective embodiments. The drawings are for facilitating an understanding of the application and thus are not necessarily drawn to scale. Advantages of the subject matter claimed will become apparent to those skilled in the art upon reading this description in conjunction with the accompanying drawings, in which like reference numerals have been used to designate like elements, and in which:

FIG. 1 is a schematic diagram of a conventional USB Type-C connector receptacle;

FIG. 2 is a schematic diagram of a conventional USB Type-C connector plug;

DETAILED DESCRIPTION

USB Type-C connectors can be configured to operate as a downstream facing port (DFP), an upstream facing port (UFP), or a dual role port (DRP). For example, a port can be designated as a DFP for "sourcing" or providing power to a connected device. On the other hand, a port on a connected device can be designated as a UFP for "sinking" the power provided by the host. In some cases, a host can comprise a DRP, which can operate as a source, as a sink, or alternate between the two states.

Figure 3:
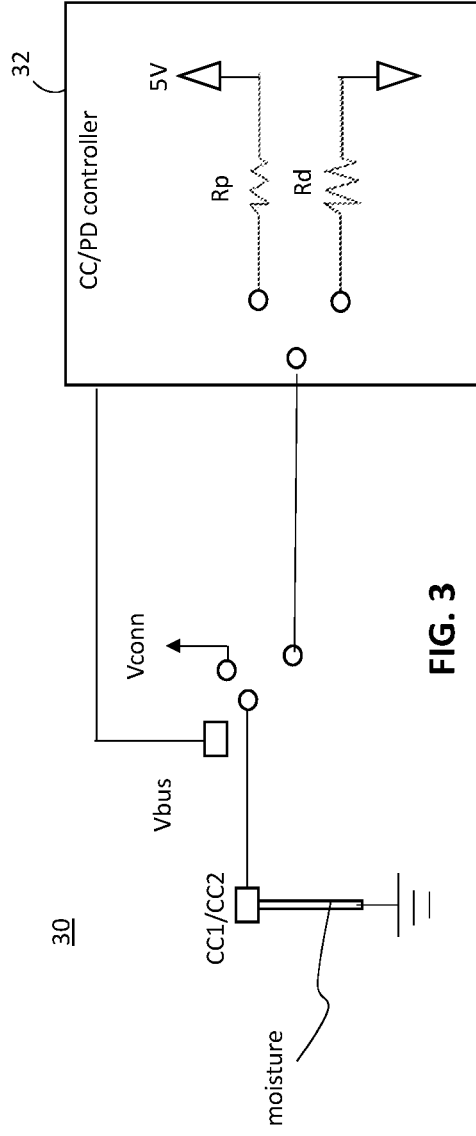
FIG. 3 is a schematic block diagram of a conventional USB connector circuit.
Figure 4:
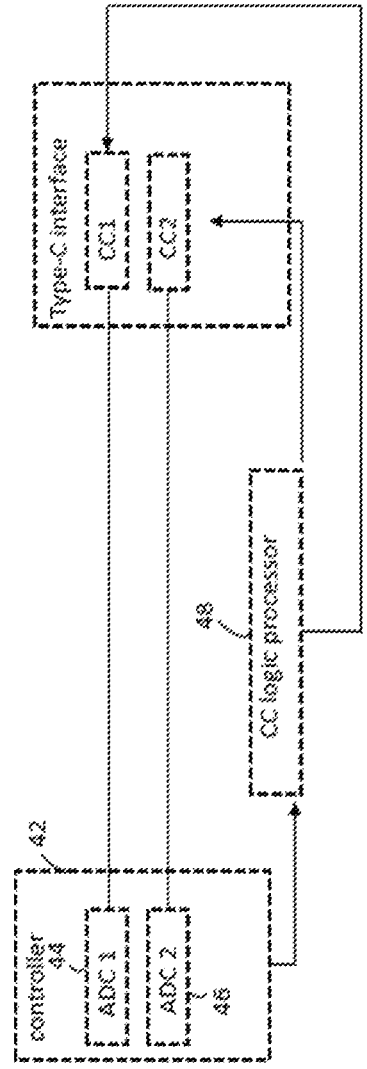
FIG. 4 is a schematic block diagram of another conventional USB connector circuit with a controller for detecting the voltage on the CC pins.
Figure 5:
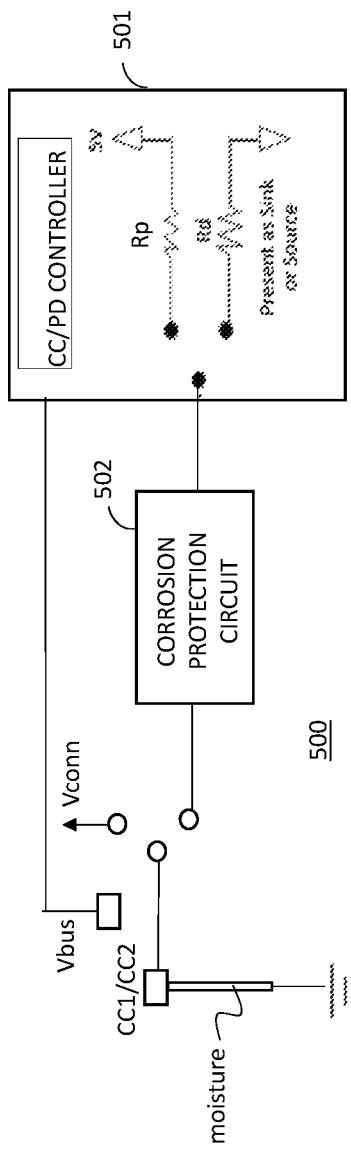
FIG. 5 is a schematic block diagram of a USB connector circuit in accordance with one embodiment of the present invention.

Referring now to FIG. 5, a USB connector circuit 500 includes first and second configuration channel pins CC1/CC2, a CC/PD controller 501, and a corrosion protection circuit 502 coupled between the configuration channel CC1/CC2 pins and the CC/PD controller 501. The CC/PD controller 501 includes a first pull-up resistor Rp connected to a first power source, which typically is 5V, and a first pull-down resistor Rd connected to ground.

Figure 6:
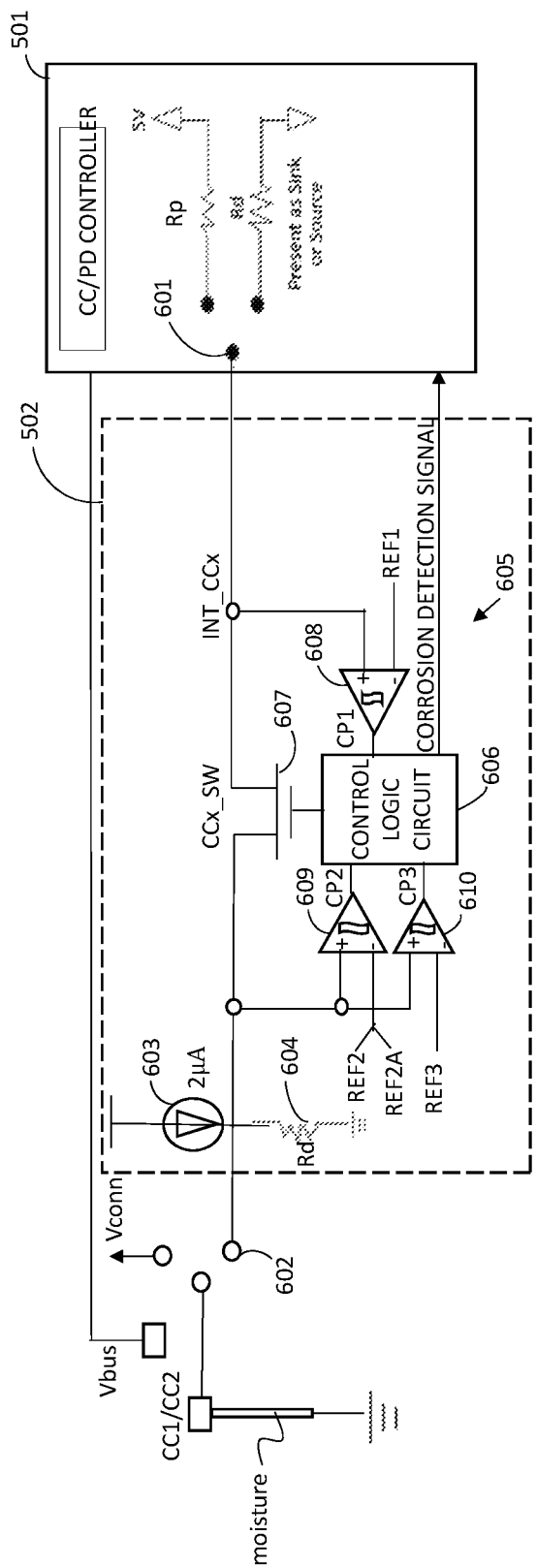
FIG. 6 is a schematic block diagram of a corrosion protection circuit in accordance with an embodiment of the present invention.

FIG. 6 is a schematic block diagram showing the corrosion protection circuit 502 in more detail. The corrosion protection circuit 502 includes a first node 601 connected to the first power source by the first pull-up resistor Rp in the CC/PD controller 501, a second node 602 coupled to the configuration channel pins CC1/CC2, a second power source 603 coupled to the second node 602, and a second pull-down resistor 604 connected between the second node 602 and ground.

The corrosion protection circuit 502 also includes a detection circuit 605 that includes a control logic circuit 606, and a switch 607 coupled between the first and second nodes 601 and 602. In one embodiment, the switch 607 includes a control terminal coupled to the control logic circuit 606 for receiving a control signal having a first state that open or turn-off the switch 607 and a second state to close or turn-on the switch 607. In the presently preferred embodiment, the second power source 603 is a current source that provides a current that is less that the current provided by the first power source (e.g. 2 $\mu$A). Providing a lower current can reduce corrosion of the CC pins. In the presently preferred embodiment, the resistance of the second pull-down resistor 604 is the same as the resistance of the first pull-down resistor Rd, which can be, for example, around 5.1 k ohms The detection circuit 605 provides corrosion detection on the CC pins. In the presently preferred embodiment, the detection circuit 605 includes first, second and third comparators 608, 609 and 610.

The first comparator 608 receives and compares a first voltage signal from the first node 601 with a first reference voltage REF1 and generates a first comparison signal that is provided to the control logic circuit 606. The second comparator 609 receives and compares a second first voltage signal from the second node 602 with a second reference voltage REF2 and generates a second comparison signal that is provided to the control logic circuit 606. In one embodiment, the second comparator 609 receives one of the second reference voltage REF2 and an intermediate reference voltage REF2A and compares the selected one of the second reference voltage REF2 and the intermediate reference voltage REF2A with the second voltage signal. The third comparator 610 receives and compares the second voltage signal from the second node 602 with a third reference voltage REF3 and generates a third comparator output that is provided to the control logic circuit 606.

The control logic circuit 606 detects when power on VBUS pin is terminated and in response, turns-off the switch 607. Then the control logic circuit 606 enables the first comparator 608 to compare the first voltage signal with the first reference voltage REF1. When the first voltage signal is greater than the first reference voltage REF1 indicates that the first node 601 is connected to the first power source through the first pull-up resistor Rp. The control logic circuit 606 enables the second power source 603 to supply power to the CC pins CC1/CC2. The control logic circuit 606 also enables the second comparator 609 to compare the second voltage signal from the second node 602 with the second reference voltage REF2, and enables the third comparator 610 to compare the second voltage signal with the third reference voltage REF3. When the second voltage signal is less than the third reference voltage REF3 and greater than the second reference voltage REF2, then the control logic circuit 606 outputs a corrosion detection signal. If corrosion is detected, the switch 607 is turned off to prevent current flow between the first and second nodes 601 and 602.

When the first voltage signal from the first node 601 is greater than the first reference voltage REF1, then the control logic circuit 606 enables the second comparator 609 to compare the second voltage signal with the intermediate reference voltage REF2A. When the second voltage signal is less than the intermediate reference voltage REF2A, that indicates that no corrosion is detected on the CC pins, so the control logic circuit 606 turns-on the switch 607 to allow current to flow between the first and second nodes 601 and 602.

When the first voltage signal is less than the first reference voltage REF1, that indicates that the first node 601 is connected to ground through the first pull-down resistor Rd, in which case the control logic circuit 606 couples the second node 602 to ground via the second pull-down resistor 604. The control logic circuit 606 also enables the second comparator 609 to compare the second voltage signal with the intermediate reference voltage REF2A. When the second voltage signal is greater than the intermediate reference voltage REF2A, that indicates that no corrosion is detected, so the control logic circuit 606 turns on the switch 607 to allow current to flow between the first and second nodes 601 and 602.

Figure 7:
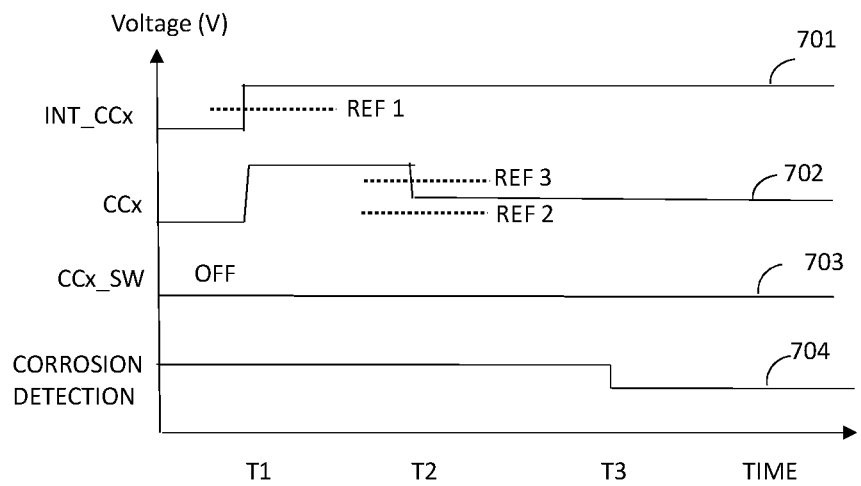
FIG. 7 shows a waveform in the circuit of FIG. 6 when corrosion is detected.

FIG. 7 shows a graph of signals in the circuit of FIG. 6 when corrosion is detected. A waveform 701 shows the voltage at the first node (first voltage signal INT_CCx) and the first reference voltage REF1 as a function of time. The first node voltage signal INT_CCx is greater than the first reference voltage at time T1. A waveform 702 shows the voltage at the second node CCx. At time T1, the control logic circuit 606 enables the second node 602 connected to the second power source. Then the second node voltage signal CCx rises and is input to the second comparator 609. At time T2, the second node voltage signal CCx falls to less than the third reference voltage REF3 and greater than the second reference voltage REF2. In this case, the control logic circuit 606 treats the CC pins as contaminated (with water) and the switch 407 is turned off (or if already off, is maintained as off). A waveform 703 shows the voltage of the switch 607, which stays low. A waveform 704 shows the corrosion detection signal (FLAGB), which shows the control logic circuit 606 send the corrosion detection signal to the CC/PD controller 501 to indicate that corrosion has been detected.

Figure 8:
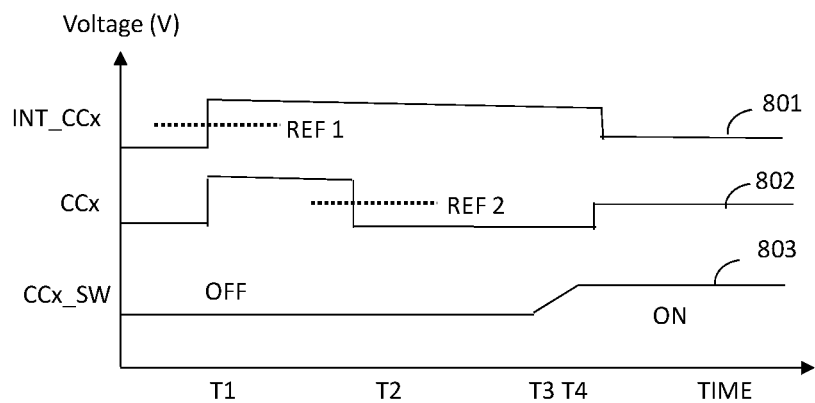
FIG. 8 shows a waveform in the circuit of FIG. 6 when a USB Type-C connector operates as an upstream facing port.

FIG. 8 shows a graph of signals of the circuit of FIG. 6 when the USB Type-C connector is operating as an upstream facing port. A waveform 801 shows the first node voltage signal INT_CCx as a function of time for a situation in which the CC/PD controller provides a voltage around 5V and a current of around 80 µA. When the first node 601 is connected to the first pull-up resistor Rp in the CC/PD controller 501, the first node voltage signal INT_CCx is greater than the first reference voltage REF1 at time T1. A waveform 802 shows the second node voltage signal CCx. At time T1, the control logic circuit 606 enables the second power source 603 to provide a current of around 2 µA to the second node 602. At time T2, the second node voltage Vccx falls sharply and keeps at a low state for a period because an external device provides a pull-down resistance to ground. After 2 ms debounce time to skip interference, at time T3, the control logic circuit 606 sends the control signal to the control terminal of the switch 607 to turn-on or close the switch 607. A waveform 803 shows the voltage of the switch 607, which rises gradually from time T3 to time T4, at which time the voltage is stable.

Figure 9:
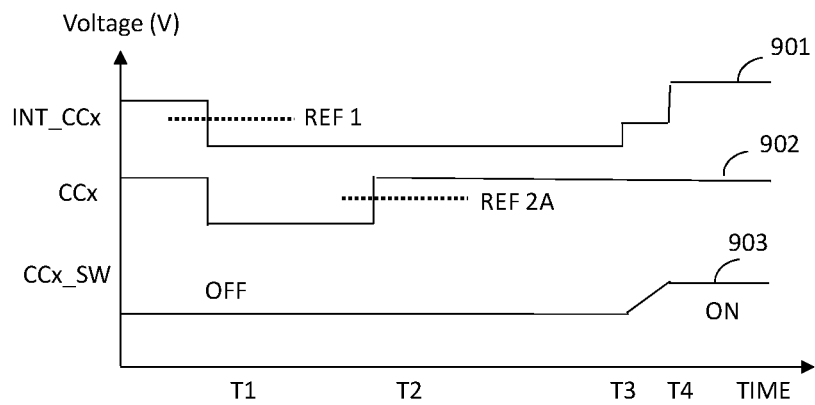
FIG. 9 shows a waveform in the circuit of FIG. 6 when a USB Type-C connector operates as a downstream facing port.

FIG. 9 shows a graph of signals of the circuit of FIG. 6 when USB Type-C connector operates as a downstream facing port. A waveform 901 shows the first node voltage signal INT_CCx as a function of time for a situation in which the first node 601 is connected to ground through the first pull-down resistor Rd. The first node voltage signal INT_CCx is less than the first reference voltage REF1 at time T1. A waveform 902 shows the second node voltage signal CCx. At time T1, the control logic circuit 606 enables the second node 602 connected to ground through the second pull-down resistor. At time T2, the second node voltage signal CCx rises and keeps at a high state for a period indicating that an external device has been plugged in and is providing a current source. At time T3, after 2 ms debounce time to skip interference, the control logic circuit 606 closes the switch 607. A waveform 903 shows the voltage signal of the switch 607, which rises gradually from time T3 to T4 and then is stable at time T4.

Figure 10:
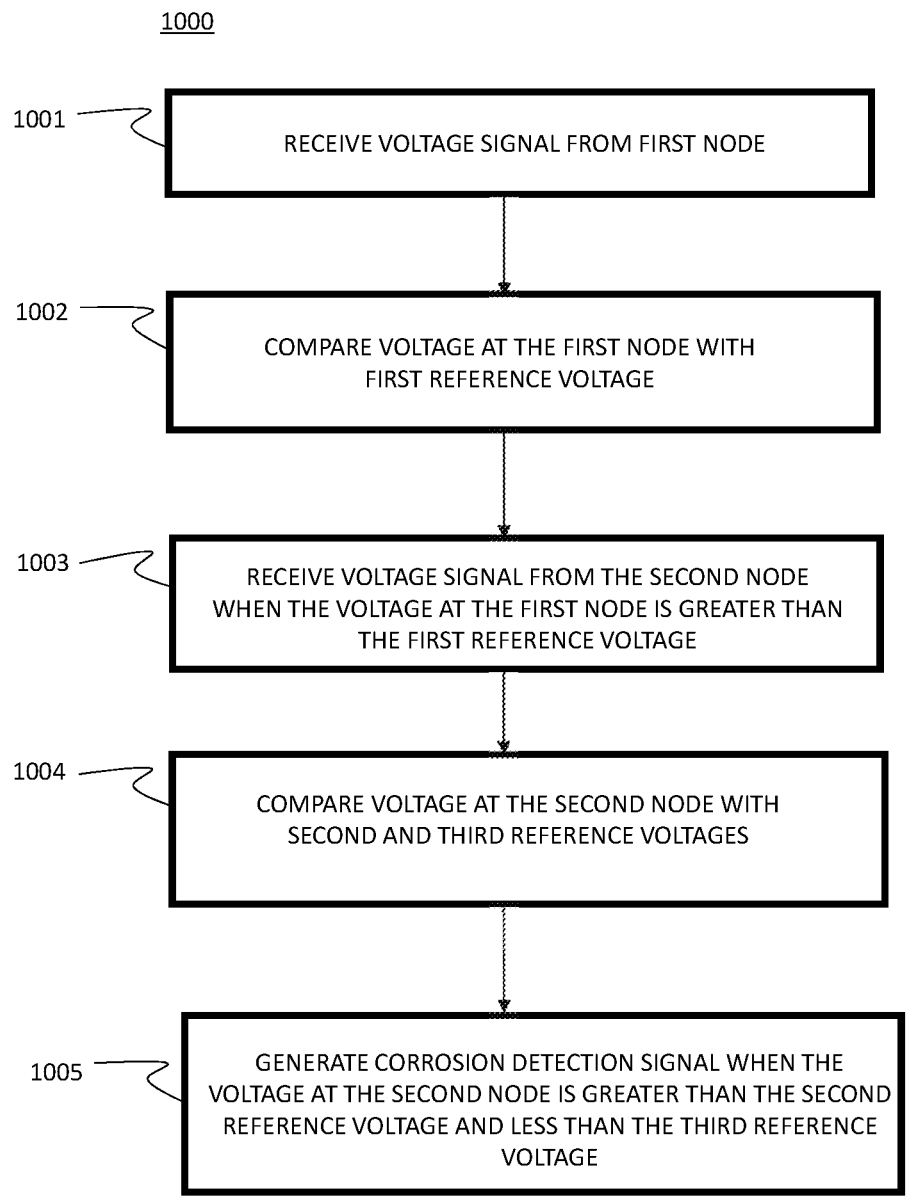
FIG. 10 is a flow chart illustrating a method to protect the CC pins of a USB connector against corrosion in accordance with an embodiment of the present invention.

FIG. 10 is a flow chart of a method 1000 of detecting corrosion on the CC pins of a USB connector according to one embodiment of the present invention. Before the method 1000 begins, the switch 607 is turned off to prevent current flow between the first and second nodes 601 and 602. At step 1001, the first node 601 receives voltage from one of the first power source or ground. At step 1002, the voltage signal from the first node 601 is compared with the first reference voltage REF1. If the first voltage signal is greater than the first reference voltage REF1, move to step 1003. At step 1003, the control logic circuit 606 enables the second node 602 coupled to the second power source 603. The second node 602 receives the voltage signal from the second power source 603. At step 1004, the voltage at the second node 602 is compared with the second and third reference voltages REF2 and REF3. If the second voltage is greater than the second reference voltage REF2 and less than the third reference voltage REF3, move to step 1005. At step 1005, the control logic circuit 606 outputs a corrosion detection signal and the switch 607 is kept turned off.

Thus, the present invention provides a corrosion protection circuit for USB Type-C connectors to check if the CC pins are contaminated, such as a liquid like water. If corrosion is detected, the corrosion protection circuit prevents the current flow from the CC/PD controller of the USB Type-C connectors to the CC pins.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the application as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

The invention claimed is:

1. A corrosion protection circuit for a Universal Serial Bus (USB) connector, comprising:
   a first node coupled to one of a first power source and ground;
   a second node coupled to CC pins of the USB connector and to a second power source;
   a detection circuit including (i) a first input coupled to the first node for comparing a first voltage signal from the first node with a first reference voltage, (ii) a second input coupled to the second node for comparing a second voltage signal from the second node with second and third reference voltages, and (iii) a control logic circuit that generates a corrosion detection signal when the first voltage signal is greater than the first reference voltage, and the second voltage signal is greater than the second reference voltage and less than the third reference voltage; and
   a switch coupled between the first and second nodes, wherein the switch is turned off to prevent current flow between the first and second nodes when the corrosion detection signal is active.

2. The corrosion protection circuit of claim 1, wherein the detection circuit includes a first comparator that receives the first voltage signal from the first node and the first reference voltage and generates a first comparator output signal that is provided to the control logic circuit.

3. The corrosion protection circuit of claim 2, wherein the second voltage signal also is compared to an intermediate reference voltage and the control logic circuit turns on the switch when the first voltage signal is greater than the first reference voltage signal and the second voltage signal is less than the intermediate reference voltage.

4. The corrosion protection circuit of claim 3, wherein the detection circuit includes a second comparator that receives the second voltage signal, the second reference voltage and the intermediate reference voltage, and generates a second comparator output signal that is provided to the control logic circuit.

5. The corrosion protection circuit of claim 4, wherein the detection circuit includes a third comparator that receives the second voltage signal and the third reference voltage, and generates a third comparator output signal that is provided to the control logic circuit.

6. The corrosion protection circuit of claim 1, wherein the control circuit turns on the switch when the first voltage signal is less than the first reference voltage and the second voltage signal is greater than the second reference voltage.

7. The corrosion protection circuit of claim 1, wherein the switch includes a control terminal coupled to the control logic circuit for receiving a control signal having a first state that turns the switch off and a second state that turns the switch on.

8. The corrosion protection circuit of claim 1, further comprising a first pull-down resister connected between the first node and the ground.

9. The corrosion protection circuit of claim 8, further comprising a second pull-down resistor connected between the second node and ground, wherein the first and second pull-down resistors have the same resistance value.

10. The corrosion protection circuit of claim 9, further comprising a current source connected to the second pull-down resistor at the first node, wherein the current source provides a current that is less than a current provided by the first power source.

11. A Universal Serial Bus (USB) Type-C connector circuit, comprising:
    CC pins;
    a CC/PD controller including a first pull-up resistor connected to a first power source and a first pull-down resistor connected to ground;
    a corrosion protection circuit connected between one of the CC pins and the CC/PD controller, wherein the corrosion protection circuit comprises:
      a first node coupled to one of the first power source and ground;
      a second node coupled to the CC pins and to a second power source;
      a detection circuit including (i) a first input coupled to the first node for comparing a first voltage signal from the first node with a first reference voltage, (ii) a second input coupled to the second node for comparing a second voltage signal from the second node with second and third reference voltages, and (iii) a control logic circuit that generates a corrosion detection signal when the first voltage signal is greater than the first reference voltage, and the second voltage signal is greater than the second reference voltage and less than the third reference voltage; and
      a switch coupled between the first and second nodes, wherein the switch is turned off to prevent current flow between the first and second nodes when the corrosion detection signal is active.

12. The USB Type-C connector circuit of claim 11, wherein the second voltage signal also is compared to an intermediate reference voltage and the control logic circuit turns on the switch when the first voltage signal is greater than the first reference voltage and the second voltage signal is less than the intermediate reference voltage.

13. The USB Type-C connector circuit of claim 11, wherein the control logic circuit turns on the switch when the first voltage signal is less than the first reference voltage and the second voltage signal is greater than the second reference voltage.

14. The USB Type-C connector circuit of claim 11, wherein the corrosion protection circuit further comprises a second pull-down resistor connected between the second node and ground, wherein the first and second pull-down resistors have the same resistance value.

15. The USB Type-C connector circuit of claim 14, wherein the corrosion protection circuit further comprises a current source connected to the second pull-down resistor at the first node, wherein the current source provides a current that is less than a current provided by the first power source.

16. The USB Type-C connector circuit of claim 15, wherein the detection circuit includes (i) a first comparator that receives the first voltage signal from the first node and the first reference voltage and generates a first comparator output signal that is provided to the control logic circuit, (ii)

a second comparator that receives the second voltage signal and the second reference voltage and generates a second comparator output signal that is provided to the control logic circuit, and (iii) a third comparator that receives the second voltage signal and the third reference voltage and generates a third comparator output signal that is provided to the control logic circuit.

\* \* \* \* \*